United States Patent
Voegele

(10) Patent No.: US 9,991,783 B2
(45) Date of Patent: Jun. 5, 2018

(54) METHOD AND APPARATUS FOR DISCHARGING AN ENERGY STORE IN A HIGH-VOLTAGE POWER SUPPLY SYSTEM

(75) Inventor: Andreas Voegele, Buehl (DE)

(73) Assignee: ROBERT BOSCH GMBH, Stuttgart (DE)

( * ) Notice: Subject to any disclaimer, the term of this patent is extended or adjusted under 35 U.S.C. 154(b) by 820 days.

(21) Appl. No.: 13/517,222

(22) PCT Filed: Nov. 5, 2010

(86) PCT No.: PCT/EP2010/066892
§ 371 (c)(1),
(2), (4) Date: Aug. 29, 2012

(87) PCT Pub. No.: WO2011/085838
PCT Pub. Date: Jul. 21, 2011

(65) Prior Publication Data
US 2013/0002209 A1    Jan. 3, 2013

(30) Foreign Application Priority Data
Dec. 21, 2009   (DE) ........................ 10 2009 055 053

(51) Int. Cl.
*H02J 7/00*   (2006.01)
*H02M 1/32*   (2007.01)

(52) U.S. Cl.
CPC .......... *H02M 1/32* (2013.01); *B60L 2240/36* (2013.01); *H02M 2001/322* (2013.01)

(58) Field of Classification Search
CPC .......... H02J 7/00; H02M 1/32; B60L 2240/36
USPC ....................................... 320/135, 166, 167
See application file for complete search history.

(56) References Cited

U.S. PATENT DOCUMENTS

| | | | |
|---|---|---|---|
| 6,982,517 B2 | 1/2006 | Reineke et al. | |
| 2005/0088147 A1* | 4/2005 | Svensson et al. | 320/134 |
| 2008/0278117 A1* | 11/2008 | Tarchinski | 320/135 |
| 2009/0268354 A1* | 10/2009 | Kaplan | 361/15 |
| 2011/0006726 A1 | 1/2011 | Dittmer et al. | |
| 2011/0057627 A1 | 3/2011 | Kuehner | |
| 2011/0093148 A1 | 4/2011 | Kuehner et al. | |
| 2011/0241581 A1* | 10/2011 | Flock et al. | 318/400.3 |

FOREIGN PATENT DOCUMENTS

| | | |
|---|---|---|
| DE | 10 2004 057 693 | 6/2006 |
| DE | 10 2007 047 713 | 4/2009 |
| DE | 10 2008 010 978 | 8/2009 |
| DE | 10 2008 010 980 | 8/2009 |
| FR | 2 831 343 | 4/2003 |
| JP | 2006 042459 | 2/2006 |

OTHER PUBLICATIONS

International Search Report, PCT International Application No. PCT/EP2010/066892, dated Apr. 4, 2011.

* cited by examiner

*Primary Examiner* — Yalkew Fantu
(74) *Attorney, Agent, or Firm* — Norton Rose Fulbright US LLP; Gerard Messina

(57) ABSTRACT

A method and to a device for discharging an energy store, in particular an intermediate circuit capacitor, in a high-voltage power supply system, in particular a DC voltage intermediate circuit in a motor vehicle, a first discharge resistor being connected parallel to the energy store, and a second discharge resistor automatically being connected parallel to the first discharge resistor when a voltage at the energy store falls below a specified threshold value.

11 Claims, 1 Drawing Sheet

METHOD AND APPARATUS FOR DISCHARGING AN ENERGY STORE IN A HIGH-VOLTAGE POWER SUPPLY SYSTEM

FIELD OF THE INVENTION

The present invention relates to a method and a device for discharging an energy store, in particular an intermediate circuit capacitor, in a high-voltage power supply system, in particular a DC voltage intermediate circuit in a motor vehicle.

BACKGROUND INFORMATION

In hybrid vehicles or motor vehicles having electric drive or fuel-cell drive systems, as a rule voltages are used that can be more than 100 volts. Voltages greater than 60 volts are referred to as "high voltage." For reasons of personal safety, high-voltage on-board electrical systems in motor vehicles must be capable of being switched off, and must be capable of being discharged within a specified time span. For this purpose, conventional high-voltage on-board electrical systems include active and/or passive discharging devices. The high-voltage power supply system in a hybrid vehicle or in a motor vehicle having electric or fuel-cell drive—often also referred to as a DC voltage intermediate circuit—includes in the simplest case an energy source in the form of a battery, a voltage converter having a DC voltage intermediate circuit capacitor that acts as a buffer capacitor for stabilizing the operating voltage of electrical consumers, one or more electric machines, and further high-voltage consumers. After separation of the high-voltage power supply from the energy source, which can take place for example by pulling out the corresponding plug connector during maintenance work, or may also be caused by an accident, all energy stores connected to the high-voltage system or to the DC voltage intermediate circuit must be discharged. Here, capacitors, such as an intermediate circuit capacitor, or for example also motors being turned off, can act as energy stores. A standard passive discharge device, i.e., a discharge device whose function is ensured even in the absence of all supply and control lines, provides in the simplest case an ohmic discharge resistance permanently connected in parallel to the intermediate circuit capacitor.

German Patent Application No. DE 10 2004 057 693 A1 describes a device for the rapid discharging of a capacitor, in particular an intermediate circuit capacitor, the capacitor being connected to an electric machine via an inverter, and being connected via a DC converter to a further electric charge store, in particular a battery. Here, the DC converter includes devices that bring about a rapid discharge of the capacitor when there is a corresponding controlling of the DC converter. In particular, at the battery side a resistor is connected by a switch to the DC converter in order to take over the electric power that is to be removed.

German Patent Application No. DE 10 2007 047 713 A1 describes a method for discharging a high-voltage system, in particular a DC voltage intermediate circuit, capable of being connected to an energy source via at least one resistor, in which the at least one resistor is used as a common resistor both for the charging, or pre-charging, process and for the discharge process of the intermediate circuit capacitors of the DC voltage intermediate circuit.

A further device, described in German Patent Application No. DE 10 2008 010 978 A1, for discharging an electrical system or an electric component, including a switchable resistor, provides that the switchable resistor includes a PTC resistor and a switch, which are thermally coupled, and that the control terminal of the switch is connected to the system voltage.

SUMMARY

The present invention provides an example method for discharging an energy store, in particular an intermediate circuit capacitor, in a high-voltage power supply system, in particular a DC voltage intermediate circuit in a motor vehicle, in which a first discharge resistor is connected parallel to the energy store and a second discharge resistor is automatically connected parallel to the first discharge resistor when the voltage at the energy store falls below a specified threshold value.

The present invention further provides an example device for discharging an energy store, in particular an intermediate circuit capacitor, in a high-voltage power supply system, in particular a DC voltage intermediate circuit in a motor vehicle, having a first discharge branch that is connected parallel to the energy store and that includes a first discharge resistor, and a second discharge branch that is connected parallel to the first discharge branch and that includes a series circuit of a switching device and a second discharge resistor. Here, a control terminal of the switching device is connected to the energy store in such a way that the switching device automatically closes when the voltage at the energy store falls below a specified threshold value.

Discharge resistors connected permanently in parallel to an energy store of a high-voltage power supply system also consume power during normal operation, which is emitted to the surrounding environment in the form of heat. In order to avoid temperatures at the discharge resistor that could damage the discharge resistor, it is necessary to provide large constructive shapes for the discharge resistor, and/or to realize the discharge resistor using a plurality of components in order to distribute the power loss on a larger surface. The provision of a first discharge resistor that is permanently connected in parallel to the energy store of a high-voltage power supply system, and of a second connectable discharge resistor, makes it possible to dimension the first discharge resistor, which also consumes power during normal operation of the high-voltage power supply system, in such a way that the power loss, and thus the radiated heat, is significantly reduced during normal operation. With the aid of the second discharge resistor, which is suitably dimensioned and connected at a suitable time, a discharge of the energy stored in the high-voltage power supply system within a specified time span can nonetheless be realized.

According to a specific embodiment of the method according to the present invention, the threshold value is defined to be less than a minimum operating voltage of the high-voltage power supply network. In this way, it can be ensured that the second discharge resistor is connected only when the voltage at the energy store is below the minimum operating voltage. The flow of current via the second discharge resistor is thus strongly limited in time, and occurs during normal operation of the vehicle only when the motor vehicle is shut off and switched on. Due to the temporally limited loading, the power loss and thus the development of heat at the second discharge resistor is significantly reduced, making it possible for example to use resistors having smaller constructive shapes, and/or to omit costly measures for heat dissipation.

According to a specific embodiment of the device according to the present invention, the first discharge resistor is formed by a series circuit of at least two resistors. The first discharge branch thus includes a series circuit of at least two resistors, the control terminal of the switching device being electrically connected to a center tap between the resistors of the first discharge branch. The two resistors of the first discharge branch then act as voltage dividers via which the switching voltage of the switching device in the second discharge branch can be set. The two resistors of the first discharge branch are here advantageously dimensioned in such a way that the switching device closes as soon as the voltage at the energy store falls below the minimum operating voltage of the high-voltage power supply system. In this way, with a low circuit outlay an automatic closing of the switching device is achieved when the voltage at the energy store falls below a specified threshold value.

According to a further specific embodiment of the device according to the present invention, the switching device includes at least one field-effect transistor; in particular, the switching device is fashioned as a self-conducting field-effect transistor. The use of a self-conducting field-effect transistor as a switching device enables a particularly simple realization of the circuitry of the device according to the present invention.

A further advantageous specific embodiment of the device according to the present invention provides that the overall resistance of the first discharge branch has a higher resistance value than does the second discharge resistor. A high resistance value of the first discharge branch ensures that the power loss, which in normal operation of the high-voltage power supply system would fall at the first discharge resistor, and thus also the component temperatures at the resistors, can be significantly reduced. If the voltage at the energy store falls below a specified threshold value, a second discharge resistor can be connected in parallel having a significantly lower resistance value and thus significantly accelerating the further discharging of the energy store. Due to the merely brief connection of the second discharge resistor, excessive component temperatures do not result at this discharge resistor that could cause damage to the discharge resistor, and that would thus require a particularly large constructive shape or installation of a plurality of components.

In addition to a passive discharge device, an additional active discharge device is often also required. According to a further specific embodiment of the device according to the present invention, the control terminal of the switching device is additionally connected to a control unit. In this way, the second discharge branch, provided as part of a passive discharge device, can also be used for the active discharging of the energy store of the high-voltage power supply system. For this purpose, the control unit simply applies a corresponding control signal to the control terminal of the switching device. Due to the use of the second discharge branch, no further components are necessary in order to realize an active discharge device.

It is to be noted that the terms "resistor" and "discharge resistor" are to be understood as referring not only to ohmic resistances, but also to other electrical components that have an ohmic portion and that are thus suitable to support the discharging of the energy store.

Further features and advantages of specific embodiments of the present invention result from the following description, with reference to the accompanying Figures.

DETAILED DESCRIPTION OF EXAMPLE EMBODIMENTS

Figure 1:
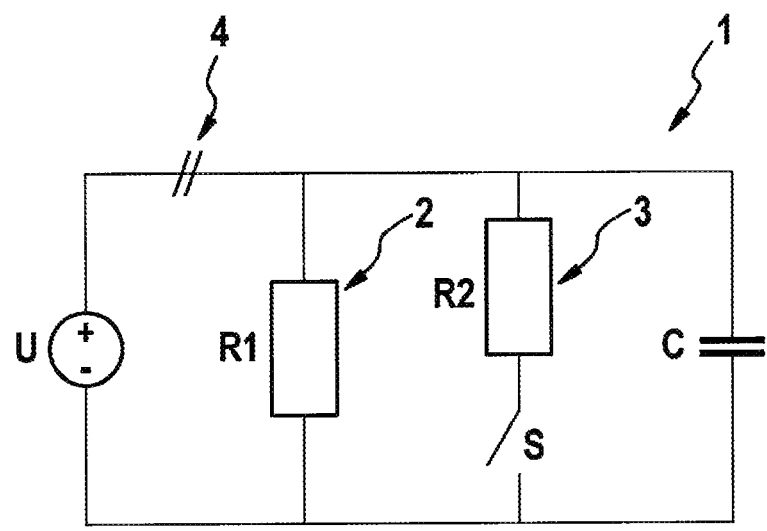
FIG. 1 shows a schematic representation of a device according to the present invention for discharging an energy store of a high-voltage power supply system.

In the Figures, identical or functionally identical components are identified by the same reference characters.

FIG. 1 shows a simplified representation of a discharge circuit for a high-voltage on-board electrical system of a hybrid, electric, or fuel cell vehicle. A high-voltage electrical system 1, frequently also referred to as a DC voltage intermediate circuit, has an energy store in the form of an intermediate circuit capacitor C, standardly used as a buffer capacitor for stabilizing the operating voltage of consumers connected to high-voltage on-board electrical system 1. In particular situations, such as after an accident or before maintenance work on the motor vehicle, the high-voltage system can be separated from a high-voltage energy source shown schematically in FIG. 1 as energy source U. In case of a two-voltage on-board electrical system in a motor vehicle, the intermediate circuit voltage supplied by energy source U corresponds for example to a high voltage that is provided by a DC converter and is substantially constant. The separation of the high-voltage system from the high-voltage energy source is indicated in FIG. 1 by the two oblique strokes 4. For reasons of personal safety, when the high-voltage system is disconnected from the high-voltage energy source, the charge stored in intermediate circuit capacitor C must be removed rapidly. For this purpose, two discharge branches 2 and 3 are provided that are connected in parallel to intermediate circuit capacitor C. First discharge branch 2 includes a first discharge resistor R1. Second discharge branch 3 includes a series circuit of a switching device S and a second discharge resistor R2.

At the beginning of a discharge process of intermediate circuit capacitor C, switching device S is first opened, so that the intermediate circuit is discharged only via first discharge resistor R1. If the voltage at intermediate circuit capacitor C falls below a specified threshold value, switching device S is closed, and second discharge resistor is thus connected parallel to first discharge resistor R1 and to intermediate circuit capacitor C. Because the circuit system is intended to realize a passive discharging of the intermediate circuit, i.e., a discharge in the absence of all supply and control lines, it is to be ensured that switching device S closes automatically when the voltage falls below the specified voltage threshold value at capacitor C.

Figure 2:
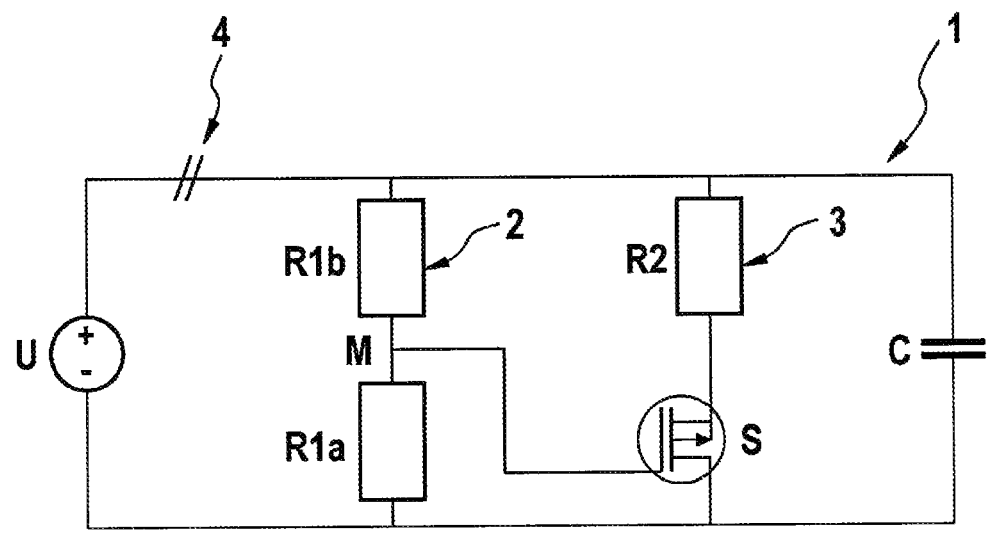
FIG. 2 shows a schematic representation of a concrete specific embodiment of a device according to the present invention for discharging an energy store of a high-voltage power supply system.

This can for example be realized in that first discharge resistor R1 is realized by a series circuit of two resistors R1$a$ and R1$b$ (see FIG. 2). The two resistors R1$a$ and R1$b$ then form a voltage divider with the aid of which a switching voltage of switching device S can be set.

FIG. 2 shows such a system having a switching device S in the form of a self-conducting field-effect transistor. The control terminal of switching device S is connected electrically to a center tap M between resistors R1$a$ and R1$b$ of first discharge branch 1. With the aid of a self-conducting field-effect transistor, the automatic closing of switching device S when a threshold value is reached can be realized particularly easily. Of course, switching device S can however also be realized using other switching elements, in particular other field-effect transistors. Thus, for example a suitable connection of two self-blocking field-effect transistors is also conceivable. If the voltage at capacitor C falls, then the voltage drop at resistor R1A also falls. As soon as the voltage drop at resistor R1a falls below the switching threshold of self-conducting field-effect transistor S, this transistor becomes conductive. This in turn has the result that second discharge resistor R2 is switched parallel to first discharge resistor R1, i.e., in the depicted exemplary embodiment, parallel to the series circuit of resistors R1a and R1b. Through suitable dimensioning of discharge resistors R1a, R1b, and R2, it can be achieved that second discharge resistor R2 is automatically connected in parallel to first discharge resistor R1 as soon as the voltage at intermediate circuit capacitor C falls below a specified threshold value. Advantageously, discharge resistors R1a, R1b, and R2 are dimensioned in such a way that the threshold value is below a minimum operating voltage of the high-voltage power supply system. In this way, it is ensured that in normal operation only first discharge resistor R1 is connected parallel to intermediate circuit capacitor C. This first discharge resistor R1 is selected to be large enough that the power loss at discharge resistor R1 does not cause excessive development of heat, so that no particular requirements must be placed on the constructive shape of the discharge resistor, and additional measures for controlling the development of heat are not required. Discharge resistor R2, which can be connected in parallel, has in contrast a significantly lower resistance value, which, after the connection in parallel has taken place, results in a significant acceleration of the discharge process.

In normal operation as well, during the switching on or switching off of the motor vehicle there can occur operating situations in which the supply voltage of the high-voltage system, and thus also the voltage at the intermediate circuit capacitor, falls below the specified threshold value of the discharge device. Thus, for example when starting the motor vehicle, i.e., in the case in which the supply voltage is first built up, switching device S can first be closed, so that current flows through second discharge resistor R2. As soon as the voltage drop over resistor R1a exceeds the switching threshold of switching device S, switching device S opens, so that during operation at the rated value only first discharge resistor R1 in first discharge branch 2 is loaded. During the start process, the discharge circuit thus forms a larger consumer then it represents during operation at the rated value. However, overall the discharge circuit consumes orders of magnitude less power than other consumers typically connected to the high-voltage system. For a central control electronics system (not shown), this effect during the starting of the motor vehicle is therefore negligible.

When the motor vehicle is shut off, the supply voltage is ramped down by the central control electronics system. If the value falls below the switching threshold of switching device S, then connected second discharge resistor R2 supports the central supply of energy during the discharging of the intermediate circuit capacitor. Because the starting and stopping of the motor vehicle are temporally limited processes, the load on the second discharge resistor is also limited. However, this load must nonetheless be taken into account in the design and dimensioning of second discharge resistor R2. In addition to the depicted use of the device according to the present invention for the passive discharging of an energy store, such as a capacitor, of a high-voltage system, the circuit can also be used for active discharging. For this purpose, the control terminal of switching device S can additionally be connected to a control unit (not shown) that can actively control switching device S so that second discharge resistor R2 can be actively connected or disconnected.

In the depicted exemplary embodiments, the high-voltage power supply system contains in each case only one energy store, in the form of capacitor C. However, it is to be noted that a high-voltage system can also include a plurality of energy stores, all of which must be discharged when the high-voltage system is disconnected from the high-voltage energy source. This can be achieved by providing a separate discharge circuit according to the present invention for each energy store. Alternatively, a higher-level discharge circuit can also be provided that is used to discharge a plurality of, or all, energy stores present in the high-voltage system.

What is claimed is:

1. A method for discharging an energy store in a high-voltage power supply system in a motor vehicle, in which a first discharge resistor is connected parallel to the energy store, the method comprising:
   automatically connecting a second discharge resistor in parallel to the first discharge resistor when a voltage at the energy store falls below a specified threshold value;
   wherein a switching device is in series to the second discharge resistor, and a control terminal for switching the switching device is connected to a terminal of the first discharge resistor in such a way that the switching device closes automatically when the voltage at the energy store falls below the specified threshold value,
   wherein the second discharge resistor is connected to the first discharge resistor only when the voltage at the energy store is below the specified threshold value.

2. The method as recited in claim 1, wherein the energy store is an intermediate circuit capacitor.

3. The method as recited in claim 1, wherein the high-voltage power supply system is a DC voltage intermediate circuit in the motor vehicle.

4. The method as recited in claim 1, wherein the threshold value is set to be smaller than a minimum operating voltage of the high-voltage power supply system.

5. A device for discharging an energy store in a high-voltage power supply system in a motor vehicle, comprising:
   a first discharge branch connected parallel to the energy store and that includes a first discharge resistor; and
   a second discharge branch connected parallel to the first discharge branch and that includes a series circuit of a switching device and a second discharge resistor, a control terminal configured for switching the switching device being connected to a terminal of the first discharge resistor in such a way that the switching device closes automatically when a voltage at the energy store falls below a specified threshold value,
   wherein the second discharge resistor is connected to the first discharge resistor only when the voltage at the energy store is below the specified threshold value.

6. The device as recited in claim 5, wherein the energy store is an intermediate circuit capacitor.

7. The device as recited in claim 5, wherein the high-voltage power supply system is a DC voltage intermediate circuit in the motor vehicle.

8. The device as recited in claim 5, wherein the first discharge branch includes a series circuit of at least two resistors, and the control terminal of the switching device is connected electrically to a center tap between the two resistors of the first discharge branch.

9. The device as recited in claim 5, wherein the switching device includes at least one field-effect transistor.

10. The device as recited in claim 9, wherein the switching device is a self-conducting field-effect transistor.

11. The device as recited in claim 5, wherein the first discharge resistor has a higher resistance value than the second discharge resistor.

\* \* \* \* \*